March 17, 1964  L. E. NICHOLS  3,125,140
SAW SET WORKS
Filed Oct. 6, 1960  2 Sheets-Sheet 2
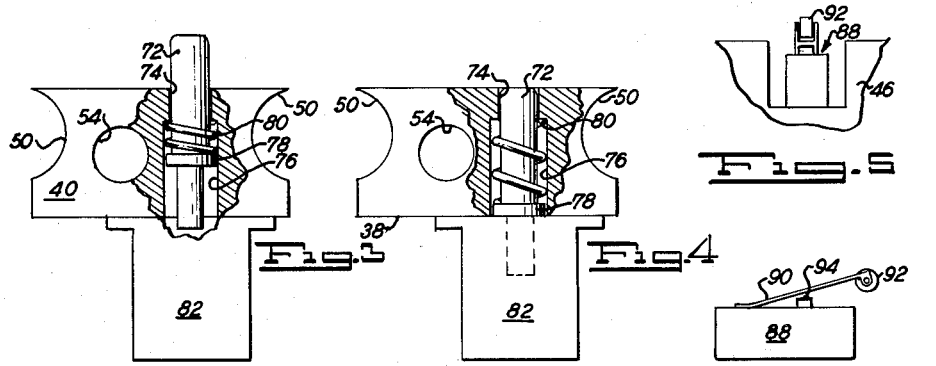
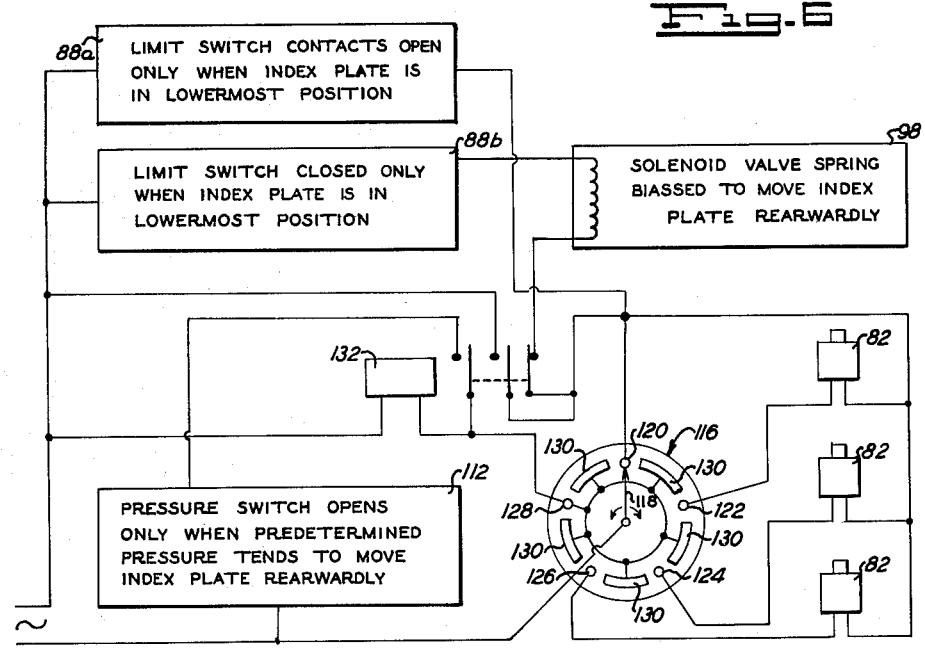
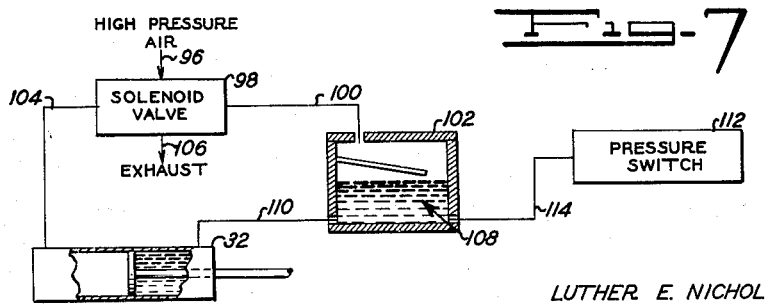
INVENTOR
LUTHER E. NICHOLS
BY *Swecker + Mathis*
ATTORNEYS

United States Patent Office 3,125,140
Patented Mar. 17, 1964

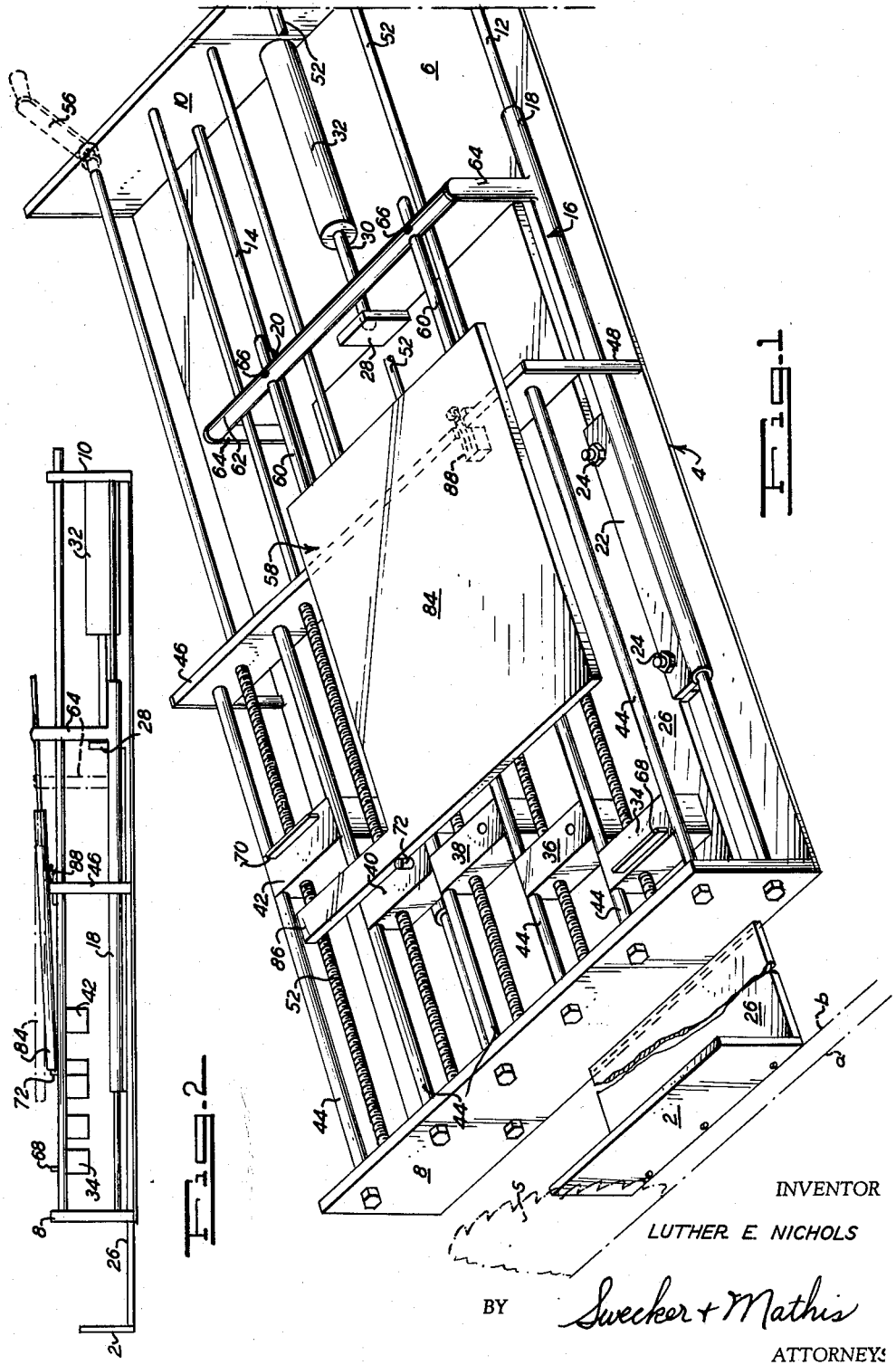

3,125,140
SAW SET WORKS
Luther E. Nichols, Morristown, Tenn., assignor to Walters Mfg. Company, Morristown, Tenn., a corporation of Tennessee
Filed Oct. 6, 1960, Ser. No. 60,845
2 Claims. (Cl. 143—174)

This invention relates to apparatus for positioning material with respect to a tool, and more particularly, to an electrical set works for a rip saw.

As ordinarily constructed, a power saw is provided with an adjustable guide extending parallel to the saw blade, so that the lumber or other work being cut may be moved along the guide and into contact with the saw blade. In such an installation, the distance from the guide to the blade determines the width of the piece cut from the work. By moving the guide toward or away from the blade in the intervals between cutting operations, the equipment can be conditioned for the production of pieces of different widths.

In large scale operations, as for example, in the manufacture of furniture, it is desirable to provide a mechanism that can be controlled by the operator and operated to adjust the position of the material guide quickly and accurately. Such a mechanism sometimes is referred to as a "set works." When a set works is used properly, the operator can selected the widths to be cut in such a way as to utilize as fully as possible the available lumber.

Both mechanical and electrical set works were known prior to the present invention. However, all of these were subject to certain disadvantages. Some of the prior set works were not easy to use, some were difficult to adjust, and some were unnecessarily expensive.

It is a general object of this invention to provide improved apparatus of this type which will overcome the objections and disadvantages encountered heretofore.

A more specific object of this invention is to provide an inexpensive but reliable electrically controlled set works which can be controlled from a remote location so as to facilitate the processing of long pieces of lumber.

Another object of the invention is to simplify and improve the means for establishing the positions of the stops determining the width settings that may be obtained by actuation of the set works.

Yet another object of the invention is to provide an electrical set works having a selector switch and having means to assure that the equipment will not operate improperly due to rapid manipulation of the switch.

The foregoing objects may be realized, in accordance with a preferred embodiment of the invention, by the provision of a set works in which a control member movable with the material guide may be urged yieldingly against a selected one of a plurality of independently adjustable stops. With a single manipulation of a selector switch, the operator of the set works may make a selection of any one of the stops and, at the same time, condition the equipment so that the control member moves automatically into abutting relationship with respect to the selected stop.

Each of the stops preferably is mounted for movement back and forth along the frame of the set works and cooperates with an adjusting screw. The several adjusting screws may be manipulated independently of each other to provide infinitely variable, independent, regulation of the positions of the several stops. This gives the operator of the equipment complete control over the width settings of the machine.

At least some of the stops are in the form of vertically reciprocable elements actuated by solenoids. When the control member is being urged into contact with such a stop, there is some danger of a jamming effect that would prevent the desired vertical movement of the stop at the time of actuation of the selector switch. The possibility of difficulty from such a jamming action is eliminated, in accordance with this invention, by the provision of means for relieving the pressure of the control member against the previously active stop each time the selector switch is manipulated.

A complete understanding of these and other features and advantages of the invention will be gained from the following detailed description of an embodiment thereof illustrated in the accompanying drawings, in which:

FIG. 1 is a perspective view of a set works for a saw;

FIG. 2 is a side elevational view of the set works shown in FIG. 1;

FIG. 3 is an elevational view, partly in section, of one of the stop means in the set works of FIG. 1;

FIG. 4 is a view similar to FIG. 3 but showing the stop element in a different position;

FIG. 5 is a detail elevational view indicating the position of a limit switch on an intermediate wall of the frame of the set works shown in FIG. 1;

FIG. 6 is a side elevational view of the limit switch of FIG. 5;

FIG. 7 is a circuit diagram for the set works of FIG. 1; and

FIG. 8 is a diagram of the fluid system for the set works of FIG. 1.

The set works illustrated in FIG. 1 of the drawings is of a type adapted for cooperation with a rip saw for determining the width of a strip of lumber severed from a large piece. In order to indicate the manner in which the set works cooperates with the saw blade, there has been included in FIG. 1, in broken lines, a diagrammatic representation of the periphery of a saw blade S. In a typical installation, the saw blade S would be rotated about a horizontal axis and would pass through a slot in a work table or the like. A dot-dash line $a$ has been included in FIG. 1 to indicate the line of intersection of the plane of the rotating saw S with the plane of the horizontal work table.

The set works is spaced laterally from the saw blade S. It includes a material-guiding member or rail 2 adapted to extend upwardly from the surface of the work table in a plane parallel to the plane of the saw S. When it is desired to rip a piece of lumber, the leading end of the board is placed upon the work table with one edge of the piece abutting against the guide rail 2. Then the lumber is manually urged along the guide rail 2 through the path of saw blade S to sever a strip therefrom.

As will be apparent, the width of the severed strip is the same as the horizontal distance between the plane of the guide rail 2, indicated by the dot-dash line $b$ in FIG. 1, and the vertical plane of the saw blade S. The set works of the invention makes it possible to change the position of the guide rail 2 quickly and conveniently, so that strips of various widths may be produced.

The set works includes a stationary frame 4 that can be secured to some stationary part of the machine with which the set works is to cooperate. The frame 4 includes a base 6 and front and rear end walls 8 and 10 secured rigidly thereto. Long bolts or rods 12 and 14 extend between the front and rear end walls 8 and 10 at a level spaced above the base 6.

A horizontally reciprocable carriage 16 is supported upon the rods 12 and 14 through sleeve members 18 and 20 that may slide back and forth along the rods 12 and 14. An inwardly extending bracket 22 is carried by each of the sleeves 18 and 20 and is attached, as by bolts 24, to a horizontal panel 26 spaced above the base 6 of the stationary frame 4. The front end portion of the panel 26 extends forwardly through a slot in the front end wall 8 of the stationary frame 4 and is connected to the material guide rail 2.

Near its rear end, the panel 26 is provided with an upstanding bracket or lug 28 through which the panel 26 may be connected to the piston rod 30 of a fluid cylinder 32. The rear end of the cylinder 32 may be connected to the rear end wall 10 of the stationary frame 4 by any suitable means. Upon actuation of the cylinder 32, the carriage 16 will be urged forwardly or rearwardly along the rods 12 and 14. Such movements change the position of the material guide rail 2 relative to the saw blade S for altering the width of the material strips to be cut.

In order to permit the pre-selection of a plurality of different locations for the material guide rail 2 relative to the saw blade S, the set works is provided with a plurality of stops. Five stop-carrying blocks 34, 36, 38, 40 and 42 have been illustrated in FIG. 1, but it will be understood that this number be varied if desired. These blocks are mounted upon horizontal rods or bolts 44 extending between the front wall 8 of the stationary frame 4 and an intermediate wall 46 secured to the base 6 through vertical leg members 48. It will be observed that the lower edge of the intermediate wall 46 is spaced above the path of movement of the panel 26 of the carriage 16, so that the presence of the intermediate wall 46 does not interfere with the desired movements of panel 26.

The overall shape of each of the blocks 34, 36, 38, 40 and 42 is the same. From FIG. 3 and FIG. 4, it will be seen that these blocks have semi-cylindrical recesses 50 in their lateral faces. These recesses 50 are of such size that they may slidingly receive the rods 44. After the apparatus has been assembled, both of the recesses 50 in each of the stop blocks cooperate with the rods 44 to prevent vertical and lateral movements of the stop blocks while permitting longitudinal adjustment thereof along the rods 44.

The positioning of each of the stop blocks 34, 36, 38, 40 and 42 may be effected by rotation of a screw threaded member 52 passing through a threaded aperture 54 (FIGS. 3 and 4) in the stop block. As shown, the members 52 extend the full length of the set works, but only their forward end portions need be threaded. The extreme rear ends of the members 52 protrude rearwardly from the rear end wall 10 of the stationary frame 4. If desired, the ends of the members 52 may be shaped to cooperate with a detachable handle member such as that suggested in broken lines at 56 in FIG. 1.

Cooperating with the stops is a control member or index plate 58 movable back and forth with the carriage 16. The plate 58 is connected to a pair of rods 60 that extend rearwardly through apertures in a freely rotatable shaft 62 carried by upstanding brackets 64 on the sleeve members 18 and 20. Set screws 66 may be provided to fix the positions of the rods 60 relative to the shaft 62 after the distance between the shaft 62 and the index plate 58 has been adjusted.

The front stop block 34 and the rear stop block 42 may have fixed stops or abutments 68 and 70 thereon for cooperation with the index plate 58, but the stop elements carried by the other blocks 36, 38 and 40 are in the form of vertically reciprocable pins 72. The mounting arrangement for these pins 72 will be clear from a consideration of FIGS. 3 and 4.

Each of the pins 72 is mounted in its support block for vertical sliding movement through an aperture 74 having an enlarged lower portion 76. An intermediate portion of the pin 72 is provided with a circumferential flange 78 of such size that it may move freely in the enlarged portion 76 of the recess, and a coil spring 80 is disposed about the pin 72 in the region between the upper end of the enlarged portion 76 of the recess and the circumferential flange 78. The extreme lower end portion of the pin 72 is positioned to cooperate with the coil of a solenoid 82 carried by the lower face of the stop block.

When the solenoid 82 is not energized, the spring 80 will urge its pin 72 downwardly into the position shown in FIG. 4. In this position, the upper face of the pin 72 is substantially flush with the upper face of its support block. When the solenoid 82 is energized, the lower end portion of the pin 72 serves as an armature for the solenoid and the pin 72 is moved upwardly against the bias of the spring 80 to a position such as that shown in FIG. 3.

From FIGS. 1 and 2 it will be observed that the pins 72 carried by all of the intermediate blocks 36, 38 and 40 are disposed within the path of movement of the main, rectangular, body portion 84 of the control member or index plate 58. When a solenoid 82 is energized to elevate a stop pin 72 located beneath the body portion 84 of the index plate 58, the upward movement of the pin 72 will raise the plate 58, swinging it about the axis of the shaft 62. On the other hand, if a pin 72 is elevated at a time when the front edge of the index plate 58 is located rearwardly thereof, the index plate 58 will remain in its lowermost position. Then, upon forward movement of the index plate 58, its leading edge will be brought into abutting relationship with the rear surface of the elevated pin 72. See, for example, the relationship that exists between the front edge of the index plate 58 and the pin 72 on the block 40 in FIG. 1.

The rear surface of the first fixed abutment 68, on the forwardmost block 34, also is disposed in the path of the leading edge of the body portion 84 of the index plate 58. If the index plate is not stopped during the forward movement thereof by one of the pins 72, its leading edge will move into abutting relationship with the abutment 68.

The second fixed abutment 70, on the rearmost block 42, cooperates with a lateral extension 86 on the index plate 58. The abutment 70 is located rearwardly of the lateral extension 86 and is adapted to be contacted by the rear edge thereof when the carriage 16 is urged all the way to the rear.

The lower surface of the body portion 84 of the index plate 58 cooperates with a limit switch 88 of conventional construction mounted on the intermediate wall 46 of the stationary frame 4. As illustrated, the switch 88 includes a spring member 90 having a roller 92 on its uper end for engaging the lower surface of the index plate 58. When the spring 90 is deflected downwardly from the position shown in FIG. 6, it engages an element 94 that controls the switching system within the body of the switch 88.

The location of the limit switch 88 is such that the spring 90 will be deflected downwardly whenever the index plate 58 is in its lower position. However, when the index plate 58 is swung upwardly about the axis of the shaft 62 by reason of the raising of a pin 72 located therebeneath, the lower face of the index plate 58 will clear the limit switch 88 and permit the spring 90 to assume the condition illustrated in FIG. 6. Thus, the electrical condition of the limit switch 88 provides an indication of whether or not the body portion 84 of the index plate 58 is located directly above an elevated stop pin 72. This information is utilized in the control of the fluid cylinder 32.

A preferred form of fluid system for the cylinder 32 is illustrated diagrammatically in FIG. 8. High pressure air enters the system through a line 96 and passes directly to a solenoid valve 98 of conventional construction. This valve 98 is spring biased toward a position in which the high pressure line 96 will be coupled with a line 100 leading to a pressure chamber 102. The valve 98 includes a solenoid that may be energized to overcome the spring bias and thereby couple the high pressure line 96 with a line 104 leading to the rear end of the fluid cylinder 32. It will be understood, of course, that when the high pressure line 96 is in communication with the line 100, the line 104 will be connected to an exhaust line 106; and that when the line 96 is in communication with the line 104, the line 100 will be connected to the exhaust line 106.

The lower portion of the pressure chamber 102 is filled with hydraulic fluid 108 and is coupled to the front end portion of the fluid cylinder 32 by a hydraulic line 110. The lower portion of the pressure chamber 102 also may communicate with a pressure switch 112 of conventional construction through another line 114.

When the high pressure line 96 is coupled to the line 104 leading to the rear end of the fluid cylinder 32, the carriage 16 of the set works is urged forwardly. The carriage will move forwardly until the leading edge of the index plate 58 is brought into abutting relationship with respect to one of the stop pins 72 or the fixed abutment 68 on the front block 34. As the carriage 16 moves forwardly, hydraulic fluid will be forced from the front end portion of the cylinder 32 into the pressure chamber 102. The presence of the hydraulic fluid in the system minimizes the likelihood of objectionable pressure surges and erratic operation.

When the high pressure line 96 is coupled to the top of the pressure chamber 102, the hydraulic fluid 108 will be forced from the chamber 102 into the front end of the fluid cylinder 32 to urge the carriage 16 of the set works rearwardly. The pressure of the air on the hydraulic fluid also will be transmitted to the pressure switch 112 which can be pre-set to operate in response to a certain pressure level.

The operator of the machine may exercise control over the set works by manipulation of a selector switch shown diagrammatically in FIG. 7 and designated by the numeral 116. This switch may be of any suitable construction. The diagram suggests a construction in which a rotatable switch element 118 is permanently connected to one side of the circuit and arranged to be moved into engagement with any one of five contacts 120, 122, 124, 126, 128, corresponding to the several stop blocks 34, 36, 38, 40 and 42 of the set works. In passing between any two of the contacts, the rotatable switch element 118 must engage one of a plurality of contact strips 130 electrically connected to the contact 128 corresponding to the rearmost stop.

As indicated in the circuit diagram, the limit switch 88 may have two sets of contacts. One set 88b will be closed only when the spring 90 is pressed downwardly, and the other set 88a will be opened only when the spring 90 is pressed downwardly.

The circuit also includes a holding relay 132 having three sets of contacts. This relay 132 cooperates with the pressure switch 112 to prevent jamming of the set works due to rapid operation of the selector switch 116.

The operation of the set works can be understood fully by visualizing the effects produced by operation of the selector switch 116.

As shown in FIG. 7, the rotatable switch element 118 is in a position corresponding to the forwardmost position of the carriage 16 of the set works. Let it now be assumed that the rotatable switch element 118 is moved clockwise to the contact 124 corresponding to the stop block 38.

During movement of the switch element 118 between the two contacts 120 and 124 it will pass over the contact strips 130 interposed therebetween to complete a circuit through the coil of the holding relay 132. Energization of the relay 132 will move its associated contacts to the left as viewed in FIG. 7. As long as this relay 132 remains energized, it is impossible to energize the coil of the solenoid valve 98 in the fluid system. This means that the spring in the solenoid valve 98 will control the operation thereof to couple the high pressure air line with the pressure chamber 102 and thereby urge the carriage 16 rearwardly.

As soon as the pressure urging the carriage rearwardly has built up to the pre-set value for operating the pressure switch 112, this switch opens to break the holding circuit for the relay 132. Thus it will be seen that the forward pressure of the index plate 58 against the forward abutment 68 must be relieved before a circuit can be completed through the coil of the solenoid valve 98. With the pressure of the plate against the abutment relieved, there is no possibility of a bind action that might prevent desired vertical swinging movement of the index plate 58 about the axis of the shaft 62.

The holding relay 132 may or may not have been released by the time the movable switch element 118 reaches the contact 124 corresponding to the stop block 38. If the holding relay 132 has not been released, a circuit will be completed through the solenoid 82 carried by the block 38 and through the intermediate one of the contacts on the holding relay 132. The pin 72 in the stop block 38 then will be elevated as soon as its solenoid 82 can overcome any frictional force that may exist between the leading edge of the index plate 58 and the abutment 68.

If the holding relay 132 has been released prior to the time the movable switch element 118 reaches the contact 124, a circuit will be completed through the solenoid 82 on the block 38, the coil of the solenoid valve 98 and the contacts 88b of the limit switch 88. Before any appreciable forward movement of the carriage 16 can take place, the pin 72 in the block 38 will rise to swing the index plate 58 upwardly. As the index plate 58 swings upwardly, the spring 90 of the limit switch 88 will assume the position shown in FIG. 6 and the condition of the contacts 88a and 88b will change. The circuit through the solenoid 82 on the block 38 then will be maintained through the contacts 88a of the limit switch 88, and the solenoid valve 98 will be short circuited. This means that the spring in the valve 98 will be effective to couple the high pressure air with the pressure chamber 102 of the fluid system and thereby urge the carriage 16 rearwardly.

The rearward movement of the carriage 16 will continue until the leading edge of the index plate 58 passes beyond the raised stop pin 72. Then the index plate 58 will swing downwardly under the influence of gravity to actuate the limit switch 88. When this occurs, the coil of the solenoid valve 98 will be energized and the carriage 16 will start to move forwardly again. Its forward movement may continue until the leading edge of the index plate 58 is brought into abutting relationship with respect to the elevated stop pin 72 on the block 38.

It is believed that the foregoing explanation of an exemplary operation of the control system will be sufficient to suggest to persons skilled in the art the manner in which the system operates when other movements are imparted to the rotatable switch member 118 of the selector switch 116. In general, it may be pointed out that the fluid system is conditioned to urge the carriage rearwardly immediately after each actuation of the selector switch 116. In some instances, this condition will exist only momentarily, but this is sufficient to relieve the forward pressure of the index plate 58 against one of the stops and assure freedom of vertical movement thereof.

The fluid system also will be conditioned to urge the carriage 16 rearwardly whenever the movable switch element 118 is at the contact 128 corresponding to the abutment 70 on the rearmost block 42 and whenever the index plate 58 has been elevated by one of the stop pins 72. At all other times, a circuit will be completed through the coil of the solenoid valve 98 and the fluid circuit will be conditioned to urge the carriage 16 forwardly.

It is recognized, of course, that various changes and modifications may be made in the construction and in the operation of the set works without departing from the spirit of the invention. Also, it is recognized that the features and principles of the invention may be utilized in position-establishing apparatus of various types other than saw set works. It is intended, therefore, that the foregoing detailed description of the illustrated embodiment be considered as exemplary only and that the

I claim:

1. In apparatus of the character described having a plurality of stop members and index means to engage said stop members; the improvement comprising an electrical control system having a circuit for each stop member, switch means for selectively completing individual ones of said circuits, separate contact means for each of said circuits sequentially disposed on said switch means, and secondary contact means disposed between each of said first contact means, said secondary contact means completing a circuit which causes rearward movement of said index means.

2. Apparatus of the character described comprising a frame, a carriage mounted on said frame for back and forth movement, a guide carried by said carriage for positioning a workpiece, fluid operated means for yieldingly urging said carriage back and forth, a member mounted on said carriage for back and forth movement bodily therewith and for vertical movement relative thereto, said member having a body portion and a lateral extension at the forward end thereof, a plurality of vertically movable stops mounted on said frame for longitudinal adjustment relative thereto, each of said stops being biased downwardly to a position below the path of movement of said member but being movable upwardly into the path of movement of the body portion of said member so that the forward edge of said member may abut against a raised stop and so that said member may be moved upwardly by the raising of a stop located therebeneath, a solenoid adjacent each of said stops for moving said stops upwardly, a first abutment mounted on said frame for back and forth adjustment forwardly of said stops and in the path of said member, a second abutment mounted on said frame for back and forth adjustment rearwardly of said stops and in the path of the lateral extension on said member, and a control circuit including a pressure responsive switch, a limit switch, a selector switch, and said solenoids, said pressure responsive switch being connected to said fluid operated means so as to respond to fluid pressure urging said carriage rearwardly, said limit switch being mounted on said frame adjacent the path of the body portion of said member so as to assume one condition when said member is in its lower position and another condition when said member is raised, said selector switch having switch positions corresponding to said stops and said abutments, said control circuit operating to cause said fluid operated means to urge said carriage rearwardly whenever said selector switch is actuated and the fluid pressure is below a predetermined value necessary to actuate said pressure responsive switch and whenever said selector switch is at a position corresponding to said second abutment and whenever said selector switch is at a position corresponding to a stop located rearwardly of the leading edge of said member, and said control circuit operating at all other times to cause said fluid operated means to urge said carriage forwardly.

References Cited in the file of this patent

UNITED STATES PATENTS

| | | |
|---|---|---|
| 22,268 | Lane et al. | Dec. 7, 1858 |
| 1,788,920 | Loeffler | Jan. 13, 1931 |
| 1,944,918 | Bielaski | Jan. 30, 1934 |
| 2,707,501 | Craik | May 3, 1955 |
| 2,714,906 | Peterson | Aug. 9, 1955 |
| 2,999,518 | Mowery et al. | Sept. 12, 1961 |